United States Patent [19]
Heske, III et al.

[11] Patent Number: 5,767,498
[45] Date of Patent: Jun. 16, 1998

[54] BAR CODE ERROR SCANNER

[75] Inventors: Theodore Heske, III, Suwanee; Denis M. Blanford, Duluth; Barry M. Mergenthaler, Lawrenceville, all of Ga.

[73] Assignee: NCR Corporation, Dayton, Ohio

[21] Appl. No.: 718,620

[22] Filed: Sep. 17, 1996

[51] Int. Cl.⁶ ...................................................... G06K 7/10
[52] U.S. Cl. ........................... 235/463; 235/494; 235/462
[58] Field of Search ................................. 235/462, 463, 235/494

[56] References Cited

U.S. PATENT DOCUMENTS

| | | | |
|---|---|---|---|
| 3,887,792 | 6/1975 | Williams et al. | 235/463 |
| 3,969,613 | 7/1976 | Vinal | 235/463 |
| 4,146,046 | 3/1979 | Dobras | 235/463 |
| 4,757,206 | 7/1988 | Ohta | 235/463 |
| 5,036,183 | 7/1991 | Ouchi et al. | 235/462 |
| 5,077,463 | 12/1991 | Sato | 235/494 |
| 5,412,196 | 5/1995 | Surka | 235/494 |
| 5,486,689 | 1/1996 | Ackley | 235/494 |
| 5,489,767 | 2/1996 | Billington | 235/494 |
| 5,602,382 | 2/1997 | Ulvr et al. | 235/494 |

*Primary Examiner*—Harold Pitts
*Attorney, Agent, or Firm*—Francis L. Conte

[57] ABSTRACT

A method and apparatus are disclosed for scanning for a defective bar code having a plurality of alternating bars and spaces of varying widths. A bar code is scanned for providing a bar code signature which is used for measuring the bar and space width as multiples of a minimum width module. By detecting fractional width of adjoining bars and spaces, error in the bar code is correspondingly detected. The measured bar code signature may be corrected by respectively increasing and decreasing the fractional width of an adjoining bar and space for obtaining substantially integer multiple modules thereof. The corrected signature may then be decoded.

22 Claims, 4 Drawing Sheets

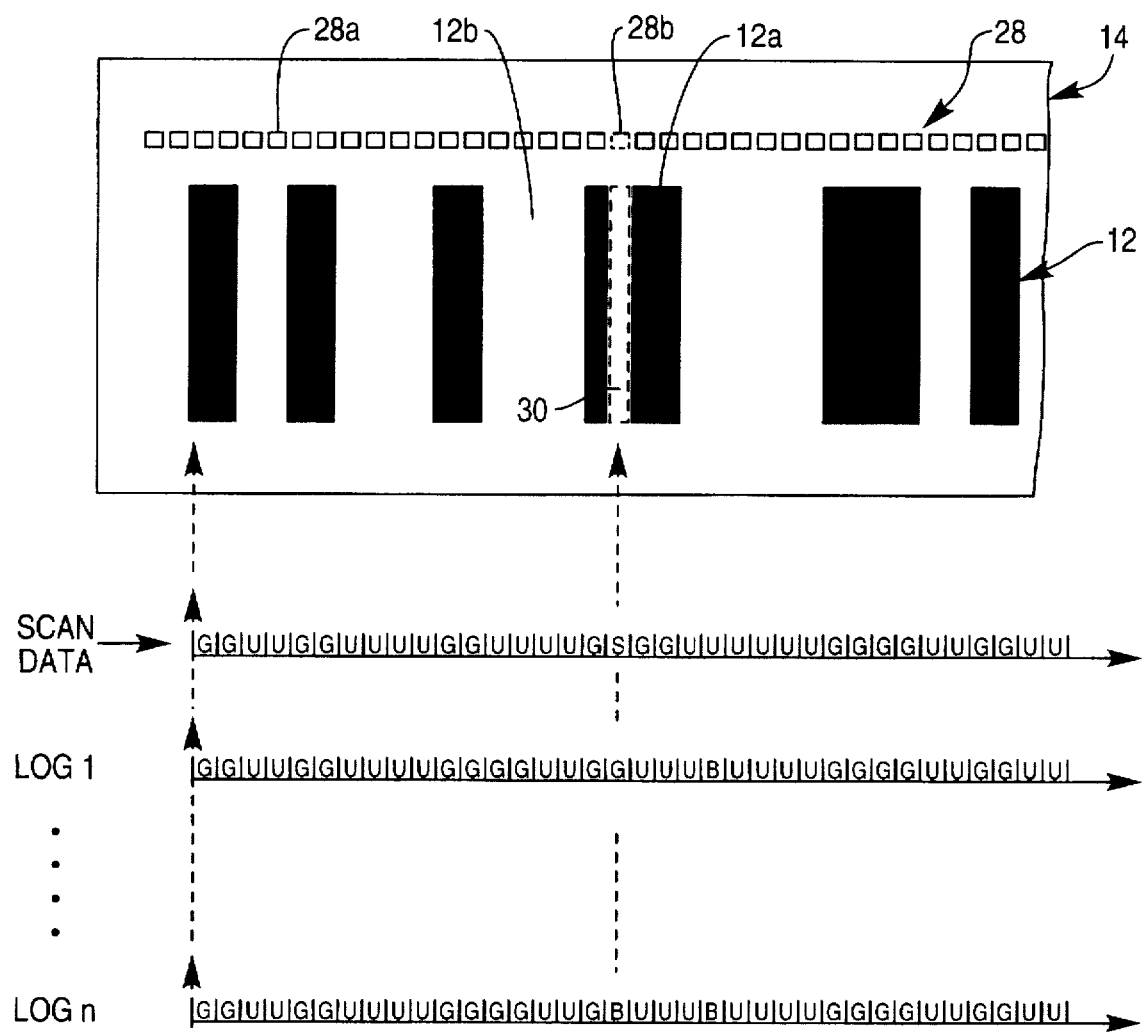

BAR CODE ERROR SCANNER

BACKGROUND OF THE INVENTION

The present invention relates generally to bar code scanners, and, more specifically, to scanning defective bar codes due to printing errors.

Conventional bar codes have varying width bars and spaces suitably printed on a label. The bar code may take any conventional form in one or more dimensions, and includes, for example, the typical one-dimensional UPC form. The UPC symbology is based on a specification enacted by the Uniform Product Code Council, Inc. of Dayton Ohio. The typical UPC bar code includes a series or sequence of alternating dark bars and light spaces of varying widths. The bars and spaces are arranged in groups representing individual characters. The bar code starts with a left margin character and ends with a right margin character, and has a center reference character as well, with the characters provided therebetween representing any desired data.

The minimum width of either a bar or space in the UPC symbology is defined as a single module which represents a unit width. The width of a single character coded using the UPC symbology is seven (7) modules. A seven module UPC character has two bar and two space elements which have varying widths to differentiate between the respective characters.

A conventional bar code scanner, such as a laser scanner, sweeps a scan beam across the bar code over all the bars and spaces, and light back scattered therefrom is suitably detected by a photodetector in the scanner which provides a signature therefor of alternating maximum and minimum signal intensity and varying time duration. The maximum signal intensity corresponds with detection of the white space, and the minimum signal intensity corresponds with detection of the dark bar. Since the sweeping speed of the scan beam is precisely known, the relative time duration of the alternating minimum and maximum signal intensities corresponds with the varying widths of the bars and spaces. The scanner includes a conventional decoder which recognizes the varying widths of the detected bars and spaces based on the width modules and provides the corresponding data characters encoded thereby.

Accordingly, the accurate sizing of the relative width of the bars and spaces is critical to properly decoding the data encoded thereby. If a bar or a space is either too wide or too narrow, the decoder will fail to recognize the bar code as being valid, and therefore the bar code cannot be read.

There are many accepted ways of printing bar code labels in existence. In one embodiment, a linear printhead, such as a thermal printer, includes a linear array of hundreds of thermal printing elements that can be heated under individual control. A label is printed by translating a thermally sensitive blank paper label past the linear thermal element array. The paper responds to the heat by darkening at the point of heat application, and remaining substantially white away from the heat. In this way, the printer elements can be individually controlled for producing images of text, numerals, and in particular bar codes on the paper.

A common failure of a linear printer is the breakage of an individual printing element. In this case, the printer is unable to print at the location of the failed element which will therefore result in a white space on the paper where corresponding dark space is intended. For a bar code label, a failed element found where a dark bar is required will produce a visible thin gap along the length of the bar where printing is absent. Such as gap in printing easily corrupts a bar code making it defective since a gap occurs along the entire length of the individual bar and correspondingly changes the width thereof from its intended size. A printing fault may occur either in the two boundaries of an individual bar or in the interior of an individual bar, which in both cases changes the corresponding width and leads to decoding failure since the bar code will no longer meet the required specification of the applicable bar code symbology.

SUMMARY OF THE INVENTION

A method and apparatus are disclosed for scanning for a defective bar code having a plurality of alternating bars and spaces of varying widths. A bar code is scanned for providing a bar code signature which is used for measuring the bar and space width as multiples of a minimum width module. By detecting fractional width of adjoining bars and spaces, error in the bar code is correspondingly detected. The measured bar code signature may be corrected by respectively increasing and decreasing the fractional width of an adjoining bar and space for obtaining substantially integer multiple modules thereof. The corrected signature may then be decoded.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 6 is a copy of the bar code of FIG. 5 along with a schematic representation of corresponding bar code signature scan data and related printer error logs.

DESCRIPTION OF THE PREFERRED EMBODIMENT(S)

Figure 1:
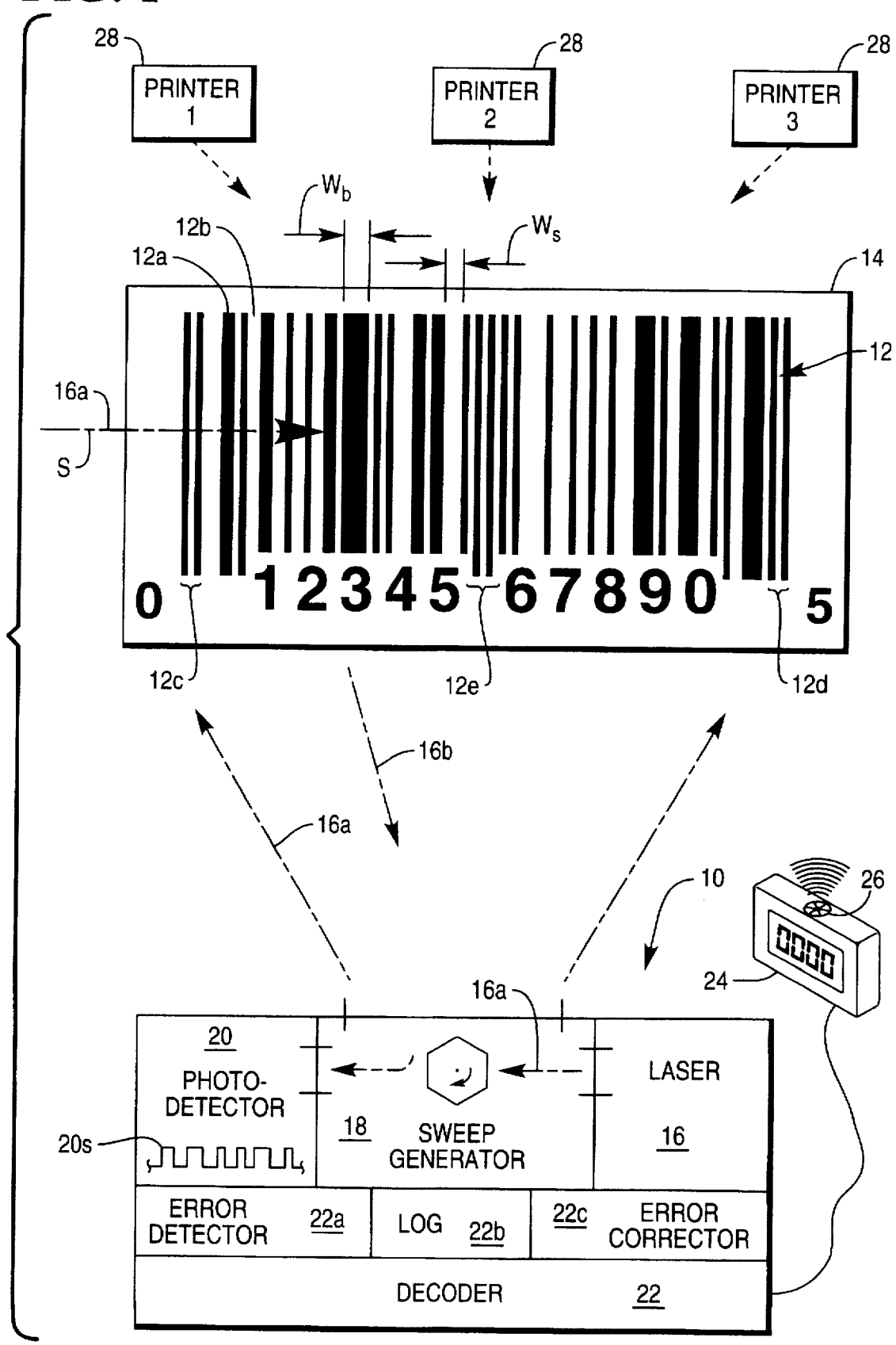
FIG. 1 is a schematic representation of a bar code scanner effective for detecting a defective bar code and correcting errors therein for allowing decoding thereof in accordance with an exemplary embodiment of the present invention.

Illustrated schematically in FIG. 1 is a laser bar code scanner 10 for scanning and decoding a conventional bar code 12 printed on a suitable label 14. The bar code 12 may take any conventional form in one or more dimensions including the conventional one-dimensional UPC symbology illustrated. The exemplary bar code 12 illustrated in FIG. 1 includes a plurality of sequential or alternating dark bars 12a and white spaces 12b which are straight and parallel to each other and have corresponding varying widths $W_b$ and $W_s$. The bars and spaces are arranged in a plurality of sequential groups defining respective characters of equal width. The minimum width of a bar or a space is defined as the minimum width module, and in the UPC symbology must exceed 9 mils by specification. A single UPC character is defined as having two bars 12a and two spaces 12b of varying widths. And, the specified widths of a single character coded using the UPC symbology must, by specification, be seven modules. Furthermore, the UPC symbology defines the maximum bar width as being four modules.

In the exemplary bar code 12 illustrated in FIG. 1, the bar code conventionally starts with a left margin character 12c, ends with a right margin character 12d, and has a center reference character 12d, with the remaining bars and spaces therebetween defining desired data characters. As indicated above, each of the data characters has a total width of seven modules and includes two bars and two spaces.

The exemplary scanner 10 illustrated in FIG. 1 includes conventional means for optically scanning the bar code 12 sequentially across the bars and spaces 12a,b over the total width of the bar code 12 from the left margin character 12c to the right margin character 12d. In the preferred embodiment illustrated, scanning is accomplished by using a conventional laser 16 which emits a suitable laser beam 16a which is suitably scanned across the face of the bar code 12 by a conventional sweep generator 18 which may take the form of a rotating multifaceted mirror. The laser beam 16a is scanned transversely across the bar code 12 in a scan direction S so that back scattered light 16b reflects off the bars and spaces back to the scanner. Since the bars 12a are dark, very little light is back scattered therefrom, whereas the spaces 12b are substantially white and more effectively back scatter light to the scanner.

A conventional photodetector 20 is provided in the scanner 10 and is suitably optically aligned therein for receiving the back scattered light 16b and producing an electrical bar code signature 20s alternating in intensity between maximum and minimum values corresponding with the back scattered light 16b from the spaces 12b and bars 12a, respectively. The time duration of the maximum and minimum intensity portions of the signature 20s corresponds with the varying widths of the bars and spaces. Since the scan beam 16a is scanned across the bar code 12 at a known and constant rate of speed, the bar code signature 20s is representative of the bar code 12 itself and may be decoded in a conventional decoder 22 specifically configured for the corresponding bar code symbology printed on the label 14.

The decoder 22 may take any conventional form and is typically a digitally programmable microprocessor containing suitable software for analyzing the bar code signature 20s and decoding the data contained therein. The scanner 10 is electrically joined to a suitable display 24 which may be used for displaying certain information encoded in the bar code 12, such as the price of a consumer product represented thereby. When the bar code 12 is accurately scanned and decoded, the data may be presented on the display 24, and a small speaker 26 operatively joined to the scanner 10 may beep to indicate successful decoding of the bar code 12.

However, if the scanner 10 is unable to decode the bar code 12, the speaker 26 will not beep and the display 24 will remain blank. Multiple passes of the bar code 12 over the scanner 10 may be attempted in order to properly read the label if possible, or if the bar code 12 is defective it cannot be read.

As described above in the Background section, the bar code 12 illustrated in FIG. 1 is typically printed using a conventional linear printer 28, three of which are illustrated schematically in FIG. 1. Multiple printers 28 are illustrated because the scanner 10 is typically used in a retail store for decoding the various bar codes found on different consumer products, which bar codes may be printed on a substantial number of different printers. Any of these printers may fail over time and improperly print the bars and spaces, with individual ones of the bars and spaces being either undersize or oversize which prevents the scanner 10 from recognizing the bar code and decoding it during normal operation.

Figure 2:
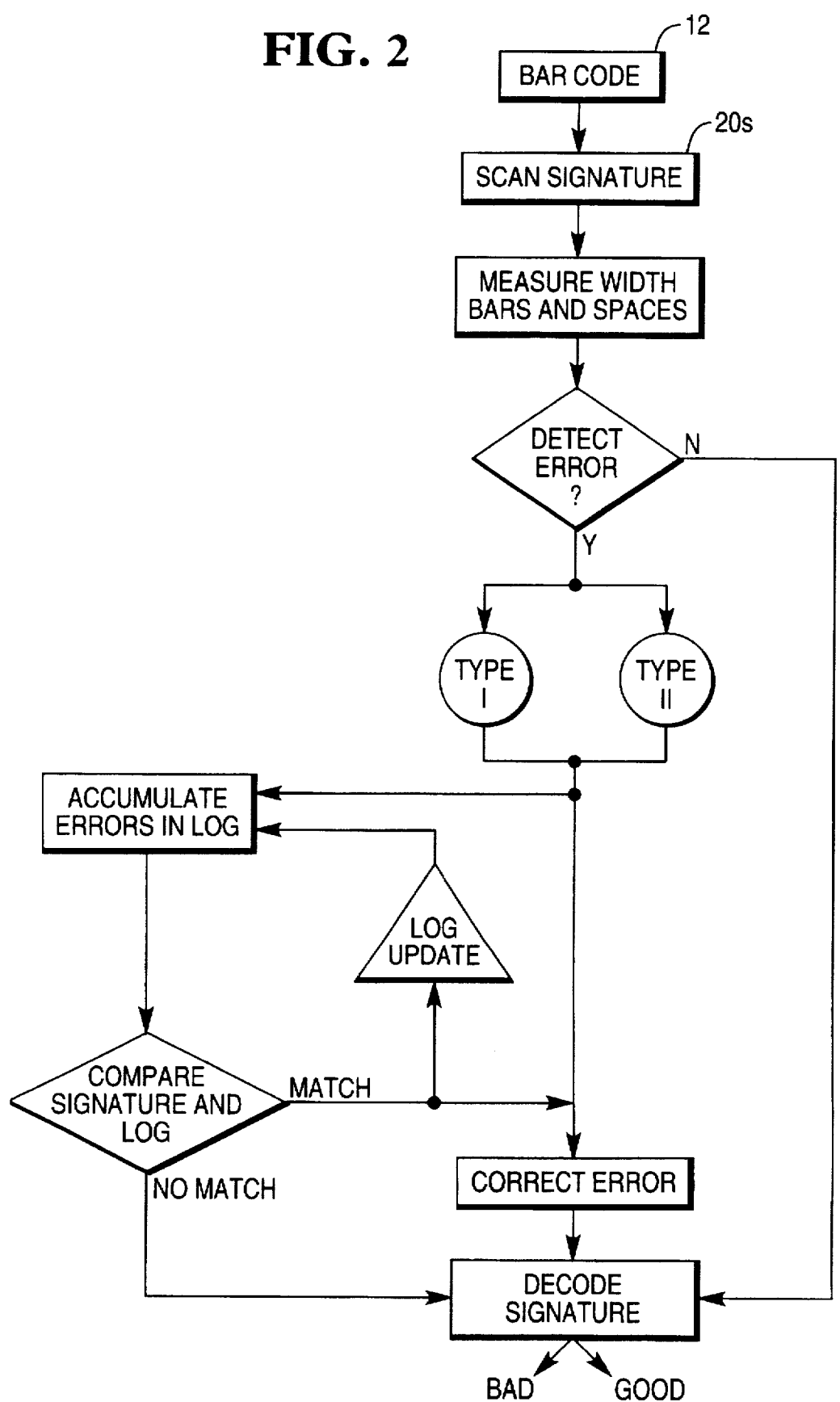
FIG. 2 is an exemplary flowchart representation of a method of detecting, correcting, and decoding a defective bar code as implemented in the bar code scanner illustrated in FIG. 1.

Since a fundamental aspect of conventionally decoding a bar code using the UPC symbology, for example, is the use of minimum width modules in defining the bar and space element, it may be used to advantage in accordance with the present invention for detecting certain types of printing errors in the bar code 12. FIG. 2 illustrates in a flowchart an exemplary method in accordance with one embodiment of the present invention which may be incorporated into the otherwise conventional scanner 10 illustrated in FIG. 1 for detecting errors in the bar code.

The method starts with any type of bar code 12 which is conventionally scanned for obtaining the bar code signature 20s thereof. The bar and space widths in the signature 20s are then suitably measured as multiples of the minimum width module. And then, sequential fractional widths of adjoining ones of the bars and spaces may be detected to uncover printing errors in the bar code 12. Since by definition in the UPC symbology, each bar 12a and space 12b must have an integer multiple of modules defining its width, fractional, or non-integer widths are indicative of bar code error which may be detected in accordance with the present invention and subsequently corrected if desired.

Figure 3:
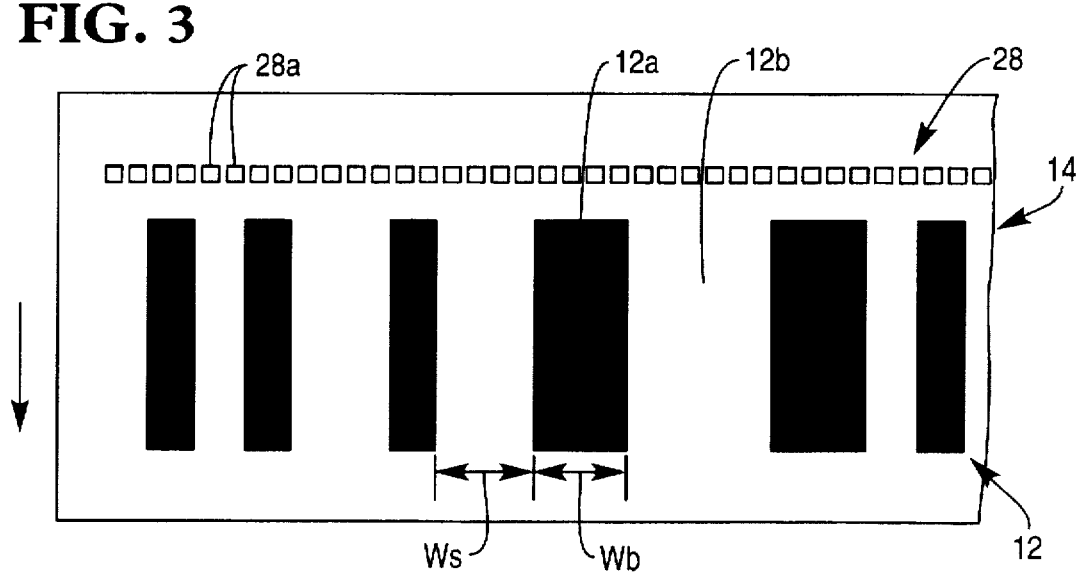
FIG. 3 is an enlarged, left margin portion of an exemplary UPC bar code label and linear printer effective for printing the bars thereon.

More specifically, FIG. 3 illustrates the left margin portion of the bar code label 14 illustrated in FIG. 1 having an exemplary bar code 12 thereon. The linear printer 28 is illustrated schematically positioned adjacent to the label 14 for conventionally printing the bars 12a thereon. The printer 28 includes a linear printhead defined by row of individual print elements 28a which may be thermal printing elements in an exemplary embodiment. Linear thermal printers are well known with each print element 28a being heated under individual control for use with thermally sensitive paper defining the label 14. As the label 14 illustrated in FIG. 3 is suitably translated downwardly as shown in the Figure respective ones of the print elements 28a are heated for thermally darkening the label 14 below the corresponding elements 28a for producing the desired bars 12a, with the spaces 12b being formed therebetween since the respective print element 28a thereat are unheated.

A representative thermal printhead has a linear resolution of 137 print elements per inch, or 7.3 mils per element. Since the UPC minimum module must exceed 9 mils, a minimum of two print elements 28a must be used to cover the minimum bar width size. Accordingly, the applicable bar code symbology determines the width of the minimum module when printing labels, and the linear resolution of the thermal printer determines the number of print elements which must be used to meet the minimum module width.

The majority of conventional linear printheads used for printing bar code labels use either two or three print elements 28a for each bar code module, with FIG. 3 illustrating two print elements 28a per module. Note that the first three bars illustrated in FIG. 3 each have a width of a single module printed by using two adjacent print elements 28a. The fourth bar 12a is two modules wide and is printed using four adjacent print elements 28a. And the corresponding spaces 12b between the adjacent bars 12a necessarily have widths of one or more modules in accordance with the symbology which are produced by merely not heating the corresponding print element 28a positioned thereabove.

Error Types

Figure 4:
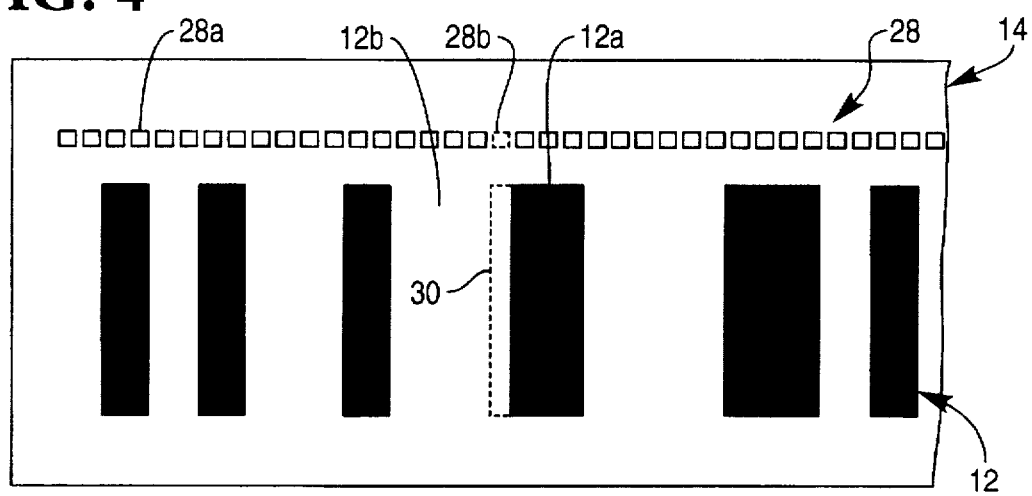
FIG. 4 is a copy of the bar code label illustrated in FIG. 3 illustrating a defective printer element at a boundary of a bar.

When a print element 28a goes bad it ceases to print. This results in two different types of errors in printed bar code labels 14. FIG. 4 illustrates a first error Type I. In FIG. 4, a bad print element 28b happens to fall on the normal boundary between a bar and space element. The bad print element 28b causes a shift in that boundary, shown in phantom, thus corrupting the intended symbol coding. When that printed label is read by a bar code scanner, the scanning device will see only the corrupted symbol. A Type I error increases the affected space width $W_s$ and shrinks the adjacent bar width $W_b$.

Figure 5:
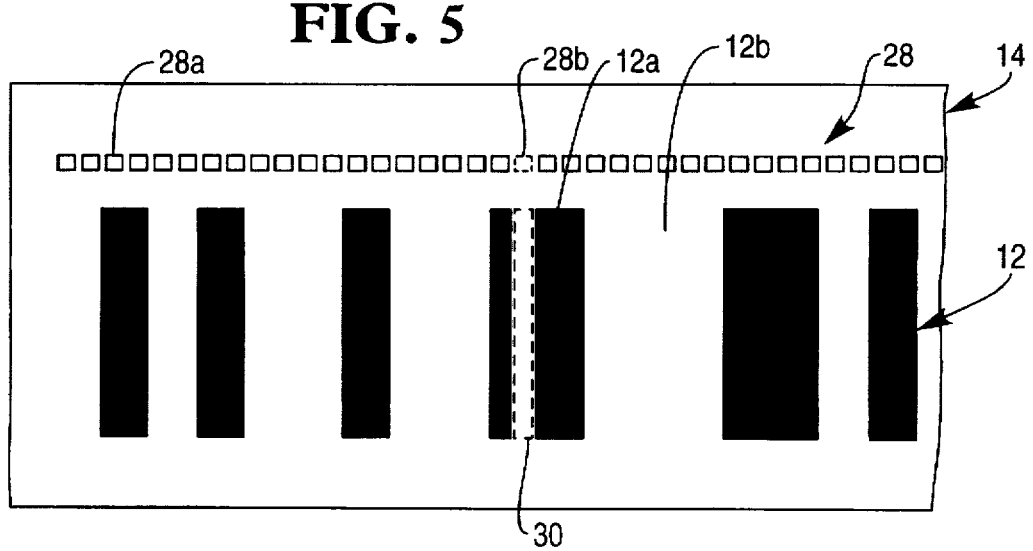
FIG. 5 is a copy of the bar code label illustrated in FIG. 3 with a defective printer element at the interior of a bar.

FIG. 5 illustrates a second error Type II. In FIG. 5, the bad print element 28b falls in the interior of an intended bar shown in phantom. The bad print element 28b causes the contiguous bar portions to incorrectly appear as a bar-space-bar pattern. When that printed label is read by a bar code scanner only the corrupted symbol will be seen. Since the corrupted symbol is not a valid coding, it will not decode via the standard methods.

Type I Error Detection

In principle, detecting a Type I error relies on the ability to detect a shifted boundary between adjacent space/bar and bar/space pairs. In many popular bar code symbologies, characters are coded using an integer number of bar and space modules. Since the typical linear printhead 28 must use more than one print element 28a per module, single print element failures will shift a boundary by a fractional amount. For example, at two print elements per module, a single defective print element 28b will shift a boundary by ½ of a module. Likewise, at three print elements per module (not shown), a single defective print element will shift a boundary by ⅓ of a module.

A Type I error is detected by looking for offsetting boundary shifts of ½ module or less occurring in adjacent space/bar or bar/space pairs. An offsetting boundary shift means that an enlarged space 12b must occur with an equivalently shrunken adjacent bar. Referring back to FIG. 4, the adjoining space is enlarged by a non-print defect 30 to 2.5 modules while the affected bar 12a is shrunken to 1.5 modules in width. All other adjacent bars and spaces measure as integer numbers of modules.

Type II Error Detection

In principle, detection of a Type II error relies on the ability to detect that a normal bar has been split into an abnormal bar-space-bar pattern by the defective printhead. Again, because the typical linear printhead 28 must use two or more print elements 28a per module, the space 30 created inside the bar as shown in FIG. 5 must be ½ module or less in width. When the width of the space is added to the width of the two adjacent bars, the total width must equal an integer number of modules. When the width of bar-space-bar combination is added to the remaining bars and spaces of that particular character, the width of the sum must conform to the character width for that particular symbology. For a true Type II error the total width of the bar-space-bar combination must be less than the maximum bar width defined for that particular symbology, e.g. four modules for UPC symbology.

As an example, consider the UPC symbology used in FIG. 5. The width of a single character coded using the UPC symbology must, by specification, be seven modules. A seven module UPC character has two bars and two spaces. Comparing a good UPC character to a UPC character corrupted by a Type II error will show that the four bars and spaces of the good character add up to seven modules while the six bars and spaces of the bad character add up to seven modules. The Type II error depicted in FIG. 5 clearly exhibits these properties.

The first and second error types described above are similar in that a single defective print element 28b fails to print the required portion of a corresponding bar 12a. However, the failure of the bad print element 28b to print does not produce an error in an intended space 12b since no printing is desired. The error types are also similar since they cause the resulting adjoining bars and spaces to have non-integer, fractional widths. Since by definition a plurality of individual print elements 28a are used for printing the individual bars 12a of varying widths by simply heating a corresponding number of the individual print elements 28a, the failure of any single print element such as the exemplary bad element 28b fails to print a fraction of the module represented by the width of the individual print element 28a. For two print elements per module, the defect 30 has a width of ½ module, and for a three print element per module embodiment, the defect has a ⅓ module width.

In the Type I error illustrated in FIG. 4, the affected space 12b adjoining the defect 30 increases in width the same amount that the adjoining bar 12a decreases in width. In the Type II error illustrated in FIG. 5, the affected bar 12a looses an interior portion thereof which has a fractional width and causes the remaining left bar portion to also have a fractional width.

Since the defect 30 in both error types illustrated in FIGS. 4 and 5 necessarily introduces a fractional component to an otherwise integer module space, then both errors may be detected by simply detecting the fractional width in the space portion of the scanned signature.

Furthermore, as indicated above the bar code 12 is encoded based on a particular symbology which defines specific data groups which are used by the decoder 22 in decoding the bar code. The bars and spaces are therefore arranged in a plurality of sequential groups defining respective characters of equal width having the same number of modules, such as seven modules for the exemplary UPC symbology. The second error type described above does not alter the total module width of the affected character group, and therefore these errors may be detected by detecting one of the groups having the proper character width while containing a fractional width space.

As indicated above, the first and second error types may be distinguished from each other by detecting whether the fractional width in an affected space is either greater than or less than a single module corresponding respectively with the second error type or the first second type.

In the first error type illustrated in FIG. 4, the defect 30 at the boundary of the affected bar 12a necessarily decreases its width by equally increasing the width of the adjacent space 12b. Since any one space 12b by definition must be at least one module wide, the addition of the fractional width in the space affected by the defect 30 increases the width of the space 12b greater than the single module. By detecting the fractional width of a space 12b being greater than a single module the first error type is indicated, which is defined by an omitted boundary portion of one side of the adjoining bar 12a. In FIG. 4, the affected space 12b has an enlarged width of 2.5 modules and the affected bar 12a has a reduced width of 1.5 modules.

The second error type illustrated in FIG. 5 which occurs in the interior of an affected bar 12a necessarily creates a space having a fractional width less than a single module. Accordingly, detecting the fractional width of a space being less than a single module indicates the second error type defined by the omitted interior portion of two adjoining bar portions. When the defective bar illustrated in FIG. 5 is scanned during normal operation, it is identified in the bar code signature as a bar-space-bar instead of a single bar. The two bar portions created by the defect 30 are read by the scanner as bars, and since the left bar portion is less than a single module wide it fails to meet the corresponding symbology and decoding of the bar code will normally fail.

As indicated above, the decoder 22 illustrated in FIG. 1 is typically implemented using suitable software in a digitally programmable processor. The decoder 22 is conventionally effective for determining the relative widths of the bars and spaces for decoding. If the relative widths do not meet specification for the particular symbology or if the individual bars, spaces or groupings thereof fail to meet the symbology specification, decoding will fail.

In accordance with the present invention, additional software may be added in the processor or decoder 22 for specifically identifying the first and second error types indicated above for subsequent evaluation and use by an operator. The scanner 10 illustrated in FIG. 1, therefore, preferably also includes means specifically configured for detecting these errors as described above which may be conventionally implemented in suitable software in an error detector 22a portion of the processor. By detecting the fractional width as indicated above, the first error type may be identified for fractional width greater than a single module, and the second error type may be identified with fractional width less than a single module. Error detection may then be suitably reported through the display 24 or by any other suitable means to the operator for subsequent evaluation in identifying the correspondingly defective printer 28.

Since the first and second error types indicated above are detectable and have a known affect in the adjoining bars and spaces, they can now be automatically corrected if desired.

Error Correction

A printed bar code label 14 that has been corrupted by a Type I or Type II error will not be read correctly by a scanner employing the standard decode methodologies. However, the error correction methods described below may be successfully applied to a previously detected Type I or Type II error.

In order to perform error correction the results of error detection are preferably accumulated. The reason for accumulating these data is to improve the quality of the error correction. While it is possible to apply a correction just based on data from a single scan of the bar code label 14, such an approach will usually result in inaccurate corrections to the faulty label. When Type I and II errors are accumulated over multiple scans of a single label or multiple labels the potential quality of error correction increases. Therefore, a Printhead Error Log (PEL) 22b is central to the error correction methods. The log 22b contains the accumulation of Type I and Type II error detections.

Printhead Error Log

The Printhead Error Log (PEL) 22b encodes and represents a model of the linear printhead used to print bar coded labels. However, the PEL is an abstraction from the actual printhead mechanism as it does not try to model individual printhead elements directly. Rather, the PEL models the printhead as a linear sequence of modules that span the total width of the bar code. The PEL uses a resolution of 1/n module, where n is an integer greater than or equal to 1. The parameter n is chosen so that Type I and Type II errors can be adequately represented for the typical one dimension bar code symbologies. The actual data in the PEL indicates the location of good and bad printhead elements across the whole width of the bar code. By using a resolution of 1/n module, the PEL accurately captures and models the effect of printhead defects on the bar code label.

As shown in FIG. 1, the log 22b may be conventionally implemented in the processor in a suitable memory provided therefor. FIG. 6 illustrates the exemplary bar code label 14 of FIG. 5 with the interior bar defect 30 schematically with associated scan data and a plurality of exemplary printhead error logs 22b designated as logs 1 ... n. The individual logs are merely linear arrays suitably stored in memory as a sequence of memory registers at locations corresponding with both the bar code 12 and any type of printer 28 forming the bars thereof. In the exemplary embodiments illustrated in FIG. 6, two register locations are provided for each module to correspond with the two printer elements 28a also corresponding with each module. In a three printer element per module configuration (not shown), three registers would be associated with each module. In this way, the logs may be used to represent the state or condition of each sub-module increment along the entire bar code 12 with a suitable resolution corresponding to expected resolutions of the printers 28.

In one embodiment, each location in the log has three possible values. The value GOOD (G) indicates that the printhead elements 28a responsible for printing that particular 1/n module width of the bar code label are in good working order. The value BAD (B) indicates that the printhead elements responsible for printing that particular 1/n module width of the bar code label are malfunctioning. A malfunctioning printhead element will fail to print a dark (bar) element when requested to do so, but, will have no effect if a light (space) element is printed at that location. The value SUSPECT (S) indicates that the printhead elements responsible for printing that particular 1/n module width of the bar code label might be malfunctioning.

It should be clear at this point that a malfunctioning printhead element will not necessarily corrupt every bar code label printed form that device. Specifically, a defective or broken printhead element will not affect the label at all if a light element (space) is desired at the location of the printhead defect.

Updating The Printhead Error Log

Before any labels have been scanned, every log location may be set to the GOOD value. As scans of various labels are performed, Type I and Type II errors will be detected as described above. The log location of an error of either type can be easily computed in the decoder 22 as a certain number of 1/n module widths from the first normally occurring bar module of the left side of the bar code. FIG. 6 illustrates the location computation using a UPC symbology, and n=2 as a specific example. The log preferably starts with the first detected bar 12a on the left side of the bar code 12 which provides a reference or index point for all subsequent locations relative thereto.

The example of FIG. 6 shows a UPC symbol printed with a Type II error located at PEL index number 18 from the left end of the symbol. As long as the printhead remains broken at this location, further labels printed on that device will continue to exhibit error types I and II at log location 18. At the first detection of a problem at log location 18, the log value is changed from GOOD to SUSPECT. As errors continue to be detected at location 18, evidence mounts that there is indeed a printhead fault causing the errors at location 18. As additional errors accumulate at location 18, the SUSPECT value is increased proportionally. After a suitable amount of errors, e.g. about 4–12 errors, have been detected at location 18 its value is changed to BAD. Only log locations containing the BAD value will be used to perform error correction.

Error Correction Using the PEL

No error correction will be attempted until the PEL contains at least one location that has been marked as BAD by the PEL update method outlined above. Error correction will only be attempted when the PEL satisfies this condition, and a Type I or II error has been detected in the current scan. If the location of the error in the current scan matches a location in the PEL which has been previously marked as BAD, the error is assumed to be caused by a malfunctioning print element. The error correction method then adjusts the scan data affected by the defective print element. The central idea of the correction method is to fill in the white space left by the defective print element or elements. Specifically, the scan data generated by the affected bar and space modules are adjusted by 1/n module width according to the location of the BAD area and the raw data is reprocessed through the standard bar code decode methods in the decoder 22. The reprocessed scan data will then yield the corrected bar code.

Accordingly, once a Type I or Type II error is detected, it can be automatically corrected by correcting the detected fractional width of the affected adjoining bar and space by respectively increasing and decreasing thereof for obtaining substantially integer multiple modules thereof. Correction may be conventionally programmed in the processor in a dedicated portion of the decoder 22 identified as an error corrector 22c as illustrated in FIG. 1. Upon detecting a defective bar code signature 20s, the signature itself may be corrected by adjusting the local intensities thereof to effectively increase the intensity of the detected defect 30 over its corresponding fractional width for instead indicating a bar portion. In this way, the signature 20s is corrected and effectively fills in the defect 30 in either the first or second error types illustrated in FIGS. 4 and 5 effectively completing the defective bar 12a thereat. The corrected signature is then conventionally processed through the decoder 22 which should then be able to successfully decode the corrected bar code. If desired, the scanner 10 may automatically report to the user through the display 24, for example, that an error has been detected and corrected.

Multiple Printhead Environment

While the error correction method described above still applies in principle, additions are preferably made to accommodate an environment in which many different printheads produce bar coded labels seen by a single scanner. Specifically, each PEL is intended to model a single printhead signature. Therefore, in a multiple printhead environment, many PEL's should be managed and updated simultaneously. There also should be a method to determine which PEL relates to the current scan data.

Associating a PEL With Scan Data

This section describes one method that is used to associate the current scan data with a particular PEL 22b. This method finds PELs that match the data and errors detected in the current scan data. The purpose of this method is to determine which, if any, PEL could have generated the current scan data. In order to facilitate these comparisons, each PEL location may have any of four states: GOOD(G), BAD(B), UNKNOWN(U), and SUSPECT(S). In addition, each corresponding location in the scan data will be characterized with any one of three states: GOOD, UNKNOWN, and SUSPECT. The assignment and manipulation of these states are described below.

Scan Data Classification

The scanning of a bar code label generates data particular to the symbols encoded on the label. That data represents bars and spaces seen in the associated bar coded label. Thus, it is possible to identify locations in the scan data that directly correspond to actual printed bars. Since the printing of a bar element demonstrates that its associated printhead element is functioning properly, it can be marked as GOOD. Where the scan data indicates a space (i.e. the absence of a bar) the integrity of the associated print element is unknown. Therefore, a space element in the scan data causes its associated location to be set to the UNKNOWN state. If Type I or Type II errors are discovered by the error detection methods described previously, the affected locations will be marked as SUSPECT. After all of PEL locations of the scan data have been classified, they will be compared to the existing PELs.

Comparing Classified Scan Data with PELs

When one or more Type I or Type II errors are detected in the current scan they may be compared with the existing PELs. If no PELs exist, a new one will be created based upon the current scan data. The error locations in the current scan are computed to a resolution of 1/n module as described above. If one or more PELs already exist then the current scan data is compared to all PELs to ascertain whether the current data matches any of the existing PELs. The intent in comparing the errors in the current scan to all PELs is to eliminate the PELs that could not generate the particular error pattern observed in the current scan. The current scan data is compared to a PEL location by location.

Table 1 illustrates the logic of the decisions made in the comparison of the current scan data to an existing PEL. If a NO MATCH decision is made on any location during the comparison process, the PEL being considered could not have produced the current scan data. Comparisons are conducted on all of the existing PELs. If a NO MATCH decision is made against all PELs then a new PEL is created and initialized according to the current scan data.

TABLE 1

Decision logic for matching existing PELs to the current scan data.

| PEL State at Current Location | Scan Data State at Current Location | Match Decision |
| --- | --- | --- |
| BAD | SUSPECT | EXACT MATCH |
| BAD | UNKNOWN | MATCH |
| BAD | GOOD | NO MATCH |
| SUSPECT | SUSPECT | EXACT MATCH |
| SUSPECT | UNKNOWN | MATCH |
| SUSPECT | GOOD | NO MATCH |
| UNKNOWN | SUSPECT | MATCH |

TABLE 1-continued

Decision logic for matching existing
PELs to the current scan data.

| PEL State at Current Location | Scan Data State at Current Location | Match Decision |
|---|---|---|
| UNKNOWN | UNKNOWN | MATCH |
| UNKNOWN | GOOD | MATCH |
| GOOD | SUSPECT | NO MATCH |
| GOOD | UNKNOWN | MATCH |
| GOOD | GOOD | MATCH |

FIG. 6 illustrates the matching process by showing a label 14, exemplary logs, and the classified scan data. Logs 1-n are generated by the method described in prior sections. Thus the errors in the current scan data e.g. at location 18, represent a definite NO MATCH to log 1. The NO MATCH decision is made because log 1 predicts GOOD at location 18 where this scan data is suspect. Thus the bar code label depicted in FIG. 6 must not have been printed with the same printhead that caused the errors now logged in log 1. Log n may now be started in the SUSPECT state described in prior sections. After a suitable number of scans, the printhead error modeled by log n will reach the BAD state shown in FIG. 6 and will thus become usable during error correction.

As mentioned previously, only PELs that have at least one location in the BAD state may participate in error correction. A newly created PEL, as in the example of FIG. 6 will not participate in error correction until its SUSPECT location has been converted to the BAD state. This conversion only happens if the same error location is detected in a suitable number of additional scans. The SUSPECT locations in PELs are converted to BAD locations through the update procedure described next.

PEL Update Procedure

After carrying out the comparison process described above, a list of zero or more PELs will be identified as matching the scan data. In the case of zero matches, a new PEL will be created, as previously described. In the case of one or more matches, the scan data is used to update the matching PELs. In addition, only those PELs that generate at least one EXACT MATCH, in the manner described by Table 1, will be updated. The update procedure is summarized in Table 2.

TABLE 2

Decision logic for updating existing
PELs using the current scan data.

| Old PEL State of Current Location | Scan Data State of Current Location | New PEL State at Current Location |
|---|---|---|
| BAD | SUSPECT | BAD+ |
| BAD | UNKNOWN | BAD |
| SUSPECT | SUSPECT | SUSPECT+ |
| SUSPECT | UNKNOWN | SUSPECT |
| UNKNOWN | SUSPECT | SUSPECT |
| UNKNOWN | UNKNOWN | UNKNOWN |
| UNKNOWN | GOOD | GOOD |
| GOOD | UNKNOWN | GOOD |
| GOOD | GOOD | GOOD |

The SUSPECT+ notation in Table 2 indicates that the state of the SUSPECT location in the PEL will increase in "suspectness" as a result of the update procedure. Typically, a counter can be associated with any suspect location, and can then be incremented every time an EXACT MATCH is seen at that location. When that counter exceeds a suitable value, the locations's state is set to BAD.

Updating is readily accomplished with suitable software in the error corrector 22c represented in FIG. 1, and is shown schematically in the flow chart of FIG. 2. Each time a bar code is scanned, the scan data corresponding to its signature is evaluated. If a bar is detected then the initial UNKNOWN for the corresponding register location is changed to the GOOD indication as represented in Table 2. And after a suitable number of scans of various bar codes printed from a given printer 28, the performance signature of that printer is represented by its corresponding log. When a specific register location is SUSPECT as indicated in Table 2, the plus (+) sign indicates the use of a suitable counter which indexes upwardly each time a SUSPECT location in the scan data matches a corresponding log register. When a sufficient number of SUSPECT matches is obtained, for example from about 4-12 matches, then the register location will be updated to reflect a BAD indication.

A BAD register location indicates the likelihood of a defective printer element 28b which will continually result in SUSPECT determination at the corresponding register location. In Table 2, the first row indicates that the BAD+ designation will also be incremented using a suitable counter each time a SUSPECT determination matches a BAD indication in the corresponding logs. In this way, as defective bar codes from a given printer 28 are scanned, a count is maintained on the cumulative total thereof. Since available memory in the scanner 10 is limited, this counter may be used for keeping a specified number of logs according to the BAD+ counter, with relatively high-count logs being kept, and the lowest count log being replaced with new logs as required.

Error Correction in Multiple Printhead Environment

An error in the current scan data will be corrected only when a PEL 1) passes the comparison process with no NO MATCH indication as described above, and 2) has an EXACT MATCH where a BAD state is logged in the PEL at the same location as the SUSPECT state in the current scan data. As was described previously, the central idea of the correction method is to fill in the white space left by the defective print element or elements. Specifically, the scan data generated by the affected bar and space modules are adjusted by 1/n module width according to the location of the BAD area and the raw data is reprocessed through the standard bar code decode methods in the decoder 22. The reprocessed scan data will then yield the corrected bar code.

Notification of Errors to User

When a successful error correction has been performed, the corrected bar code will be transferred to the user (terminal). An indication of the type of error encountered may also be transferred to the user. Presumably, the user can then take corrective action to fix or replace the defective printhead.

As indicated in FIG. 2, the first and second error types may be immediately corrected and decoded if desired. It is preferred, however, to accumulate the bar code errors in a corresponding one of the error logs over a plurality of scans of individual bar codes and successive bar codes. In this way, the logs will accurately reflect the condition of respective printers 28. And then in subsequent scans, a bar code error may be detected and compared with each of the several logs for finding a match therebetween. Upon finding a suitable match, automatic correction of the bar code error may then be accomplished as above described.

Each of the error logs represented schematically in FIG. 6 preferably comprises a linear sequence of registers as shown corresponding with respective locations along the total width of the bar code 12, with each register indicating the existence of a bar code error at the location associated therewith. The register is initially set to an UNKNOWN designation. And, over a suitable number of scans, the register will eventually change to a BAD designation upon ensuring the existence of a BAD printer element 28b. Accurate resolution of the various bar codes 12 themselves and the corresponding printers 28 is readily obtained by providing a plurality of the registers corresponding with each of the modules defining the bar code 12. In a preferred embodiment, the number of registers per module is equal to the number of printer elements 28a per module in a one to one correspondence.

By providing a plurality of the error logs, a corresponding number of individual printers 28 may be modeled for continually identifying the performance thereof in an attempt to identify defective printers 28. Since the scanner 10 illustrated in FIG. 1 is effective for detecting bar code errors and alerting the operator thereof, then the operator in turn may perform an investigation to try to determine which of several printers 28 is defective, and then in turn correct the defective printer 28.

Furthermore, since the above method of detecting and correcting defective bar codes may be readily incorporated in suitable software within dedicated portions of the decoder 22 as described above, it may also be readily retrofitted in existing scanners by suitable programming changes. Existing scanners and decoders have the capability of determining relative widths of bars and spaces in typical bar codes and may be suitably modified for also identifying the fractional widths disclosed above due to the failure of a single printer element 28a to print where required in a bar 12a.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method of scanning a bar code having a plurality of alternating bars and spaces of varying widths comprising:
   scanning said bar code sequentially across said bars and spaces for providing a bar code signature;
   measuring said bar and space widths in said signature as multiples of a minimum width module; and
   detecting a fractional width in adjoining ones of said bars and spaces for detecting error in said bar code.

2. A method according to claim 1 further comprising detecting said fractional width in one of said spaces.

3. A method according to claim 2 wherein said bars and spaces are arranged in a plurality of groups defining respective characters of equal width, and further comprising detecting one of said groups containing said fractional width space.

4. A method according to claim 3 further comprising detecting said fractional width in said space being greater than or less than a single module.

5. A method according to claim 4 further comprising detecting said fractional width of said space being greater than said single module for indicating a first error type defined by an omitted boundary portion at one side of said adjoining bar.

6. A method according to claim 4 further comprising detecting said fractional width of said space being less than said single module for indicating a second error type defined by an omitted interior portion of one of said bars.

7. A method according to claim 5 further comprising:
   correcting said detected fractional width of said adjoining bar and space by respectively increasing and decreasing thereof for obtaining substantially integer multiple modules thereof; and
   decoding said corrected bar code signature.

8. A method according to claim 7 further comprising:
   accumulating said bar code errors in an error log over a plurality of said scans;
   detecting said bar code error in a subsequent scan;
   comparing said detected bar code error with said log; and
   correcting said bar code error in said subsequent scan.

9. A method according to claim 8 wherein said log comprises a linear sequence of registers corresponding with respective locations along a total width of said bar code, with each register indicating the existence of said bar code error at said location associated therewith.

10. A method according to claim 9 further comprising a plurality of said registers corresponding with each of said modules defining said bar code.

11. A method according to claim 10 further comprising:
   a plurality of said error logs;
   comparing said detected bar code error with each of said logs; and
   correcting said bar code error upon matching thereof with a corresponding one of said logs.

12. A scanner for scanning a bar code having a plurality of alternating bars and spaces of varying widths comprising:
   means for scanning said bar code sequentially across said bars and spaces for providing a bar code signature;
   means for measuring said bar and space widths in said signature as multiples of a minimum width module; and
   means for detecting a fractional width in adjoining ones of said bars and spaces for detecting error in said bar code.

13. A scanner according to claim 12 wherein said detecting means is effective for detecting said fractional width in one of said spaces.

14. A scanner according to claim 13 wherein said bars and spaces are arranged in a plurality of groups defining respective characters of equal width, and said detecting means is further effective for detecting one of said groups containing said fractional width space.

15. A scanner according to claim 14 wherein said detecting means is further effective for detecting said fractional width in said space being greater than or less than a single module.

16. A scanner according to claim 15 wherein said detecting means is further effective for detecting said fractional width of said space being greater than said single module for indicating a first error type defined by an omitted boundary portion at one side of said adjoining bar.

17. A scanner according to claim 16 wherein said detecting means is further effective for detecting said fractional width of said space being less than said single module for indicating a second error type defined by an omitted interior portion of said adjoining bar.

18. A scanner according to claim 16 further comprising:

means for correcting said detected fractional width of said adjoining bar and space by respectively increasing and decreasing width thereof in said signature for obtaining substantially integer multiple modules; and means for decoding said corrected bar code signature.

19. A scanner according to claim 16 further comprising:

an error log for accumulating said bar code errors over a plurality of said scans;

means for detecting said bar code error in a subsequent scan;

means for comparing said detected bar code error with said log; and means for correcting said bar code error in said subsequent scan.

20. A scanner according to claim 19 wherein said error log comprises a linear sequence of registers corresponding with respective locations along a total width of said bar code, with each register indicating existence of said bar code error at said location associated therewith.

21. A scanner according to claim 20 further comprising a plurality of said registers corresponding with each of said modules defining said bar code.

22. A scanner according to claim 21 further comprising:

a plurality of said error logs; and wherein said comparing means is effective for comparing said detected bar code error with each of said logs, and said correcting means is effective for correcting said bar code error upon matching thereof with a corresponding one of said logs.

* * * * *